(12) United States Patent
Satoh et al.

(10) Patent No.: US 6,987,776 B1
(45) Date of Patent: Jan. 17, 2006

(54) MULTIPLEX COMMUNICATION METHOD, THE DEVICE AND THE SYSTEM THEREOF

(75) Inventors: Hideaki Satoh, Tokyo (JP); Mikihiro Suzuki, Tokyo (JP); Atsushi Horio, Tokyo (JP); Fujio Matsui, Tokyo (JP); Mitsunori Ishii, Tokyo (JP)

(73) Assignees: Fuji Jukogyo Kabushiki Kaisha, Tokyo (JP); Toyo Microsystems Corporation, Tokyo (JP)

( * ) Notice: Subject to any disclaimer, the term of this patent is extended or adjusted under 35 U.S.C. 154(b) by 919 days.

(21) Appl. No.: 09/615,777

(22) Filed: Jul. 13, 2000

(30) Foreign Application Priority Data

Feb. 10, 2000  (JP)  .............................. 2000-033980

(51) Int. Cl.
   *H04L 12/403*  (2006.01)
(52) U.S. Cl. ...................................... 370/450; 370/503
(58) Field of Classification Search ................ 370/429, 370/535, 450, 350, 546, 451, 452, 453, 454, 370/455, 456, 457, 503, 516, 517, 518, 519
See application file for complete search history.

(56) References Cited

U.S. PATENT DOCUMENTS

| 5,241,543 | A | * | 8/1993 | Amada et al. | 370/509 |
| 5,253,252 | A | * | 10/1993 | Tobol | 370/452 |
| 5,515,404 | A | * | 5/1996 | Pearce | 375/371 |
| 5,566,180 | A | * | 10/1996 | Eidson et al. | 370/473 |
| 6,320,871 | B1 | * | 11/2001 | Mizuguchi et al. | 370/452 |
| 6,426,962 | B1 | * | 7/2002 | Cabezas et al. | 370/516 |
| 6,700,899 | B1 | * | 3/2004 | Cao | 370/450 |

FOREIGN PATENT DOCUMENTS

| JP | 60014548 | | 1/1985 |
| JP | 61-253945 | | 11/1986 |
| JP | S61-253945 | * | 11/1986 |
| JP | 3-204254 | | 9/1991 |
| JP | 4-167795 | | 6/1992 |
| JP | 5-257852 | | 10/1993 |
| JP | H5-257852 | * | 10/1993 |
| JP | 6-252955 | | 9/1994 |

OTHER PUBLICATIONS

Office Action, dated Mar. 4, 2003, issued by Japanese Patent Office, for Japanese Patent Application No. 2000-033980, together with partial English-language translation (6 pages).

* cited by examiner

*Primary Examiner*—Kwang Bin Yao
(74) *Attorney, Agent, or Firm*—Smith, Gambrell & Russell

(57) ABSTRACT

A communication buffer 102 of a node has a plurality of storage areas for storing transmission data of other nodes. The plurality of nodes receive data transmitted by the token passing communication method and store the received data to the storage area corresponding to the transmission originator by a micro-sequencer 101. The node specified as a transmission destination informs a receiving acknowledgment.

4 Claims, 15 Drawing Sheets

FIG. 21

| ALERT | SID | DID | DID | CP | DATA 0 | ... | TIME DATA | TIME DATA | CRC | CRC |

(DATA N-1) (DATA N)

MULTIPLEX COMMUNICATION METHOD, THE DEVICE AND THE SYSTEM THEREOF

BACKGROUND OF THE INVENTION

1. Field of the Invention

The present invention relates to a multiplex communication method, a multiplex communication device and a multiplex communication system for implementing multiplex communication by means of token passing.

2. Description of the Related Art

Hitherto, there have been known remote I/O and token passing as a typical communication method of LAN (Local Area Network). FIG. 1 shows the structure of a remote I/O communication system. In FIG. 1, a plurality of terminals 2 are connected with a host unit 1 by LAN and each terminal 2 exchanges information by accessing to a host unit 1. The terminals 2 can make communication from each other only through the host unit 1 in this communication method.

When the plurality of terminals 2 access to the host unit 1 in the same time, an arbitrator within the host unit 1 arbitrates the accesses. Normally, a priority is given to each terminal 2 and the arbitrator permits the access of the terminal 2 in accordance to the priority.

FIG. 2 shows the structure of a communication system using the token passing communication method. In FIG. 2, a plurality of nodes 10 is connected in LAN and data called as token representing a right of transmission circulates on the LAN. Only node obtaining the token obtains the data transmission right. The node which has finished transmission releases the token and sends it to the next node. Thus, the communication is controlled so that the plurality of nodes does not transmit data simultaneously by causing the nodes to transmit data one after another by circulating the token.

The following problems occur when the remote I/O communication method in FIG. 1 is applied to a vehicular control system.

(1) Because only a terminal having a high priority accesses to a host unit when a plurality of terminals transmit data in the same time, terminals having low priorities have no chance to access to the host. For example, when a terminal transferring a control signal for the connection of a door has a priority lower than that of a terminal transferring an engine control signal, there is a possibility that the door does not open even when a passenger tries to escape by opening the door of the car at the time of emergency.

Meanwhile, although the problem (1) described above does not occur when the token passing communication method is adopted because each node can make own control in parallel, there arise the following problems.

(2) It has a drawback that the same time cannot be stipulated and the control cannot be made among the plurality of nodes in common because the plurality of nodes do not operate in synchronism.

It is noted that although there has been known a communication method of making a communication among a plurality of electronic control units by using a communication protocol called as CAN as a LAN communication method of a vehicular control system besides those described above, this communication method has the both problems of (1) and (2) described above.

All of the above-mentioned communication methods and other conventional communication methods have had merits and demerits to use in a control system of an apparatus such as those in a vehicle which requires reliability and there have been no suitable communication method.

SUMMARY OF THE INVENTION

Accordingly, it is an object of the invention to improve the token passing communication method and to provide a multiplex communication method, a multiplex communication device and its multiplex communication system which can enhance the reliability more than those in the past.

Another object of the invention is to improve the token passing communication method and to provide a multiplex communication method which provides new functions.

In order to achieve such objects, according to a first aspect of the invention, in a multiplex communication method, a token is circulated among a plurality of nodes, a node receiving the token has a data transmission right, and the node obtaining the data transmission right transmits data by specifying another specific node as a transmission destination and wherein each of the plurality of nodes has a storage unit having a plurality of storage areas for each storing the data transmitted from the other plurality of nodes, wherein the node specified as the transmission destination and each of the nodes not specified as the transmission destination comprises steps of receiving the data transmitted from the node obtaining the data transmission right; and of storing the received data in the storage area corresponding to the node of the data transmission originator within the plurality of storage areas.

According to a second aspect of the invention, in the multiplex communication method in the first aspect, the plurality of storage areas are correlated with IDs of the plurality of nodes including own node and the storage area corresponding to ID of own node is used as a storage area of data to be transmitted from itself.

According to a third aspect of the invention, in the multiplex communication method in the second aspect, it has a first transmission mode of transmitting data to the other nodes via the storage unit and a second transmission mode of transmitting data to the other nodes without going through the storage unit and allows the first transmission mode or the second transmission mode to be selected to automatically transmit data every time in receiving the token.

According to a fourth aspect of the invention, in the multiplex communication method in the first aspect, IDs are assigned to the plurality of nodes according to a predetermined order, the node assigned to the last of this order is indicated that it is the last of the order, the indicated node sets the destination to which the token is passed at the head of the order and the node not indicated sets ID of the node adjoining to the node assigned to itself as the destination to which the token is to be passed on the order.

According to a fifth aspect of the invention, in the multiplex communication method in the first aspect, the storage unit of the plurality of nodes has a temporary buffer further and stores the data received by the node to the corresponding storage area after temporarily storing to the temporary buffer.

According to a sixth aspect, in the multiplex communication method in the fifth aspect, an error check code is included in the transmitted data, a node receiving the transmission data judges whether or not there is an error in the data stored in the temporary buffer based on the error check code and the receiving data stored in the temporary buffer is transferred to the corresponding storage area when there is no error.

According to a seventh aspect of the present invention, in the multiplex communication method in the sixth aspect, when it is detected that there is an error in the judgment whether or not there is an error in the node specified as the transmission destination, the transmission originating node finds that there has been an error in the data by not returning ACK.

According to an eighth aspect of the invention, in the multiplex communication method in the first aspect, only node specified as the transmission destination notifies a data receiving acknowledge message to the transmission originating node.

According to a ninth aspect of the invention, in a multiplex communication method, a token is circulated among a plurality of nodes, a node receiving the token has a data transmission right and the node obtaining the data transmission right transmits the data by specifying another specific node as a transmission destination, wherein each node has a function of adding an error check code to the transmission data and of checking the receiving data based on the error checking code, the transmission data to which the error checking code is added is coded in CMI and is transmitted and a node receiving the transmitted data decodes the data in CMI.

According to a 10 th aspect of the invention, in a multiplex communication method, a token is circulated among a plurality of nodes, a node receiving the token has a data transmission right and the node obtaining the data transmission right transmits the data by specifying another specific node as a transmission destination, wherein the node to which the token is passed acknowledges the token passing and when there is no acknowledgment of passing, the token passing originating node carries out the token passing process by a predetermined number of times.

According to a 11 th aspect of the invention, in a multiplex communication method, a token is circulated among a plurality of nodes, a node receiving the token has a data transmission right and the node obtaining the data transmission right transmits the data by specifying another specific node as a transmission destination, the multiplex communication method further comprises steps that the node obtaining the data transmission right obtains clock information and that adds the obtained clock information to the data to be transmitted.

According to a 12 th aspect of the invention, in the multiplex communication method in the 11 th aspect, it has a first mode of transmitting by adding clock information and a second mode of not adding clock information and allows the first mode or the second mode to be selected.

According to a 13 th aspect of the invention, in the multiplex communication method in the 11 th aspect, a clock master which provides reference clock is determined in advance among the plurality of nodes, the node of clock master transmits data by including the clock information in the transmission data, the nodes other than the clock master receive the clock information within the data transmitted from the clock master to control own internal clock so as to adjust to the reference clock indicated by the received clock information.

According to a 14 th aspect of the invention, in the multiplex communication method in the first aspect, each of the plurality of nodes inputs data to be transmitted to the other nodes from the outside, allows to write the data to be inputted by dividing into a plurality of times and data being rewritten is not transmitted when data is transmitted during the plurality of times of writing because the held previous data is transmitted.

According to a 15 th aspect of the invention, in a multiplex communication method, a token is circulated among a plurality of nodes, a node receiving the token has a data transmission right and the node obtaining the data transmission right transmits the data by specifying another specific node as a transmission destination, wherein the node obtaining the data transmission right transmits the same data twice and the receiving node compares the data transmitted twice whether they coincide and receives either one of the data transmitted twice as receiving data only when it is judged that they coincide.

According to a 16 th aspect of the invention, in the multiplex communication method in anyone of the first aspect through the 15 th aspect, the node is an electronic control unit for controlling a predetermined mechanism of a vehicle.

According to a 17 th aspect of the invention, in the multiplex communication method in the 16 th aspect, a communication protocol having no priority is used in the communication between the nodes.

According to a 18 th aspect of the invention, in a multiplex communication device, a token is circulated among a plurality of nodes each using a multiplex communication device, a node receiving the token has a data transmission right and the node obtaining the data transmission right transmits the data by specifying another specific node as a transmission destination, wherein the multiplex communication device comprises: storage means having a plurality of storage areas for storing data transmitted by the other nodes, respectively; receiving means for receiving the data transmitted by the other node regardless of the transmission destination; and control means for storing the received data in a storage area corresponding to the data transmission originating node among the plurality of storage areas.

According to a 19 th aspect of the invention, in the multiplex communication device in the 18 th aspect, the node is an electronic control unit for controlling a predetermined mechanism of a vehicle.

According to a 20 th aspect of the invention, in the multiplex communication device in the 19 aspect, a communication protocol having no priority is used in the communication between the nodes.

According to a 21 st aspect of the invention, in a multiplex communication system, a token is circulated among a plurality of nodes, a node receiving the token has a data transmission right and the node obtaining the data transmission right transmits the data by specifying another specific node as a transmission destination, wherein each of the plurality of nodes comprises a storage unit having a plurality of storage areas for storing data transmitted by the other plurality of nodes, respectively and the node specified as the transmission destination and each node not specified as the transmission destination have a function for receiving the data transmitted by the node which has obtained the data transmission right and a function for storing the received data in a storage area corresponding to the data transmission originating node among the plurality of storage areas.

According to a 22 nd aspect of the invention, in the multiplex communication system in the 21 st aspect, the node is an electronic control unit for controlling a predetermined mechanism of a vehicle.

According to a 23 rd aspect of the invention, in the multiplex communication system in the 22 nd aspect, a communication protocol having no priority is used in the communication between the nodes.

BRIEF DESCRIPTION OF THE DRAWINGS

FIG. 21 is a block diagram showing the system structure of the other embodiment 3-2 of the invention;

DETAILED DESCRIPTION OF THE PREFERED EMBODIMENT

Embodiments of the present invention will be explained in detail below with reference to the drawings.

Figure 1:
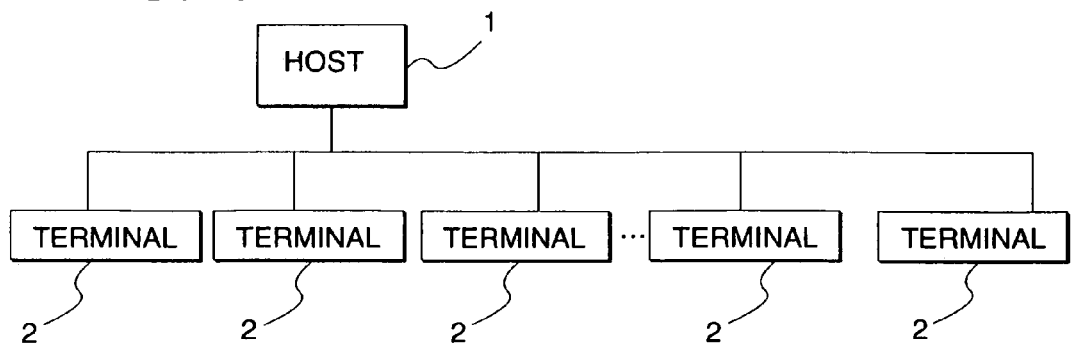
FIG. 1 is a block diagram showing the system structure of a conventional communication system.
Figure 2:
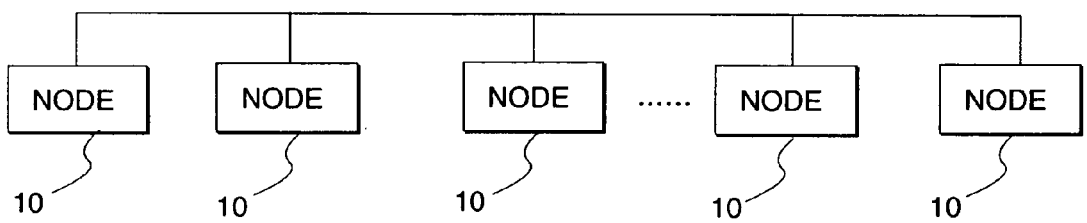
FIG. 2 is a block diagram showing the system structure of another conventional communication system and of an embodiment of the present invention.
Figure 3:
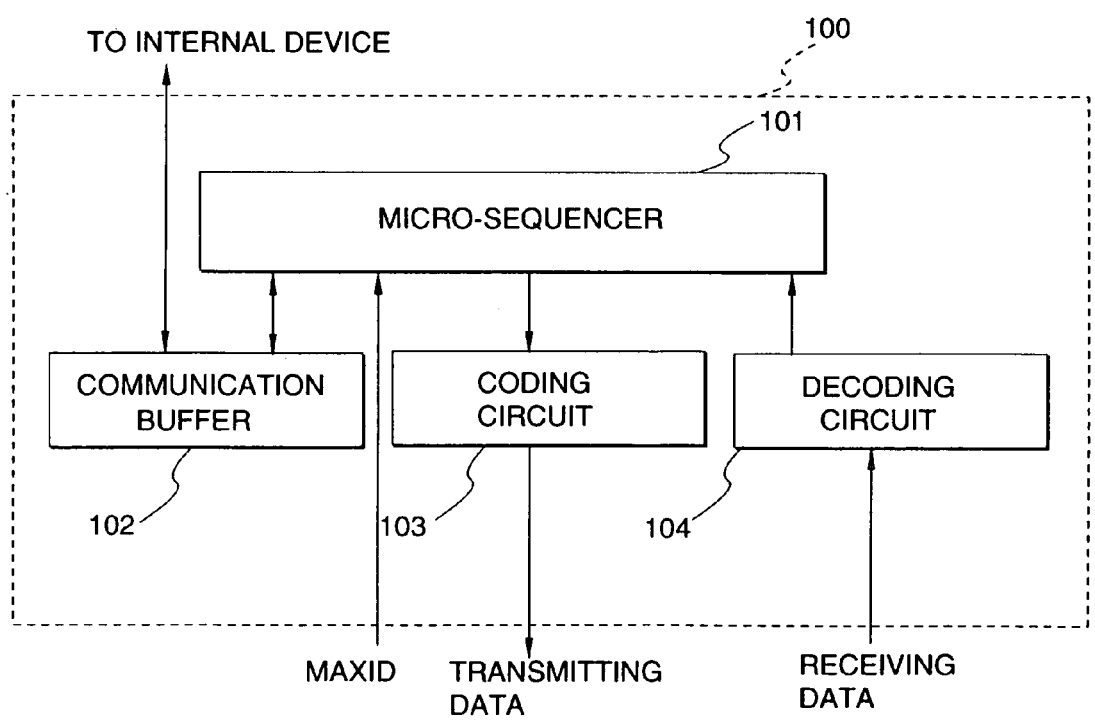
FIG. 3 is a block diagram showing the structure of a communication device according to the embodiment of the invention.

The whole (multiplex) communication system of the present embodiment may be constructed in the same manner with the prior art system in FIG. 2. However, the structure of a (multiplex) communication unit provided within each node 10 in FIG. 2 is different from the prior art. FIG. 3 shows the circuit structure of the communication unit.

In FIG. 3, the communication device 100 is structured by IC. The reference numeral (101) denotes a micro-sequencer which controls data transmission/receiving in accordance to the invention and (102) a communication buffer for storing the transmitted/received data. A received data storage area of the communication buffer 102 is divided into a plurality of areas and the divided area is correlated with an identification number (ID) of the plurality of nodes 10 connected to the LAN in advance. The present embodiment is characterized in a novelty that all nodes share data as the communication device of each node 10 receives the data transmitted to the other node 10.

Table 1 shows one example of the storage area of the communication data buffer 102.

TABLE 1

| STORAGE ADDRESS | PAGE | USE |
|---|---|---|
| 000 - 01F | #00 | TEMPORARY BUFFER |
| 020 - 03F | #01 | DATA FROM NODE 01 |
| 040 - 05F | #02 | DATA FROM NODE 02 |
| 060 - 07F | #03 | DATA FROM NODE 03 |
| . | . | . |
| . | . | . |
| . | . | . |
| 3A0 - 3BF | #1D | DATA FROM NODE 1D |
| 3C0 - 3DF | #1E | TRANSMISSION BUFFER |
| 3E0 - 3FF | #1F | DATA FROM NODE 1F |

In this example, the node ID is 1E and a data storage area corresponding to this ID (own ID) becomes an area for storing the transmission data. The received data is stored temporarily in a temporary buffer and is stored in a storage area corresponding to a node ID indicated by transmission originator data indicated by the received data after ending verification (error check, described later) of the received data. The IDs may be put in order in a predetermined manner. Although the order is not limited to be ascending or descending order, it is easiest to control the communication by the ascending order.

The reference numeral (103) denotes a coding circuit for coding data to be transmitted to the other nodes 10 by the CMI coding method and (104) a decoding circuit for decoding the received data by the CMI decoding method.

A signal MAXID indicates a maximum node ID value on the network and allows to know that the own node ID is the largest among the connected nodes 10 when the maximum node ID value coincides with own ID. This signal may be generated by a dip switch or the like.

Figure 4:
FIG. 4 is an explanatory chart showing a communication format according to the embodiment of the invention.

The multiplex communication method carried out among the plurality of nodes 10 having such communication device will be explained next. FIG. 4 shows a communication format of data transmitted in a mode of packet from the nodes. In FIG. 4, Alert is data positioned at the head of the packet and functions as a synchronizing signal.

SID is source ID (ID of the transmission originator).

DID is ID of the destination of transmission. CP is data specifying data size. DATA0 through DATAN is data to be transmitted. N bytes data is transferred in this example.

CRC is an error check code for cycle redundancy check (CRC) In the present embodiment, the micro-sequencer 101 of the communication device in the node 10 connected to the LAN receives the transmission data on the LAN, stores it temporarily in the temporary buffer in the communication buffer 102 and then checks errors of the data 0 through data N by using the CRC data within the received data. When no error is detected, the micro-sequencer 101 judges that from which the received data is sent based on the SID data within the received data and stores it in a corresponding storage area within the communication buffer 102.

Figure 26:
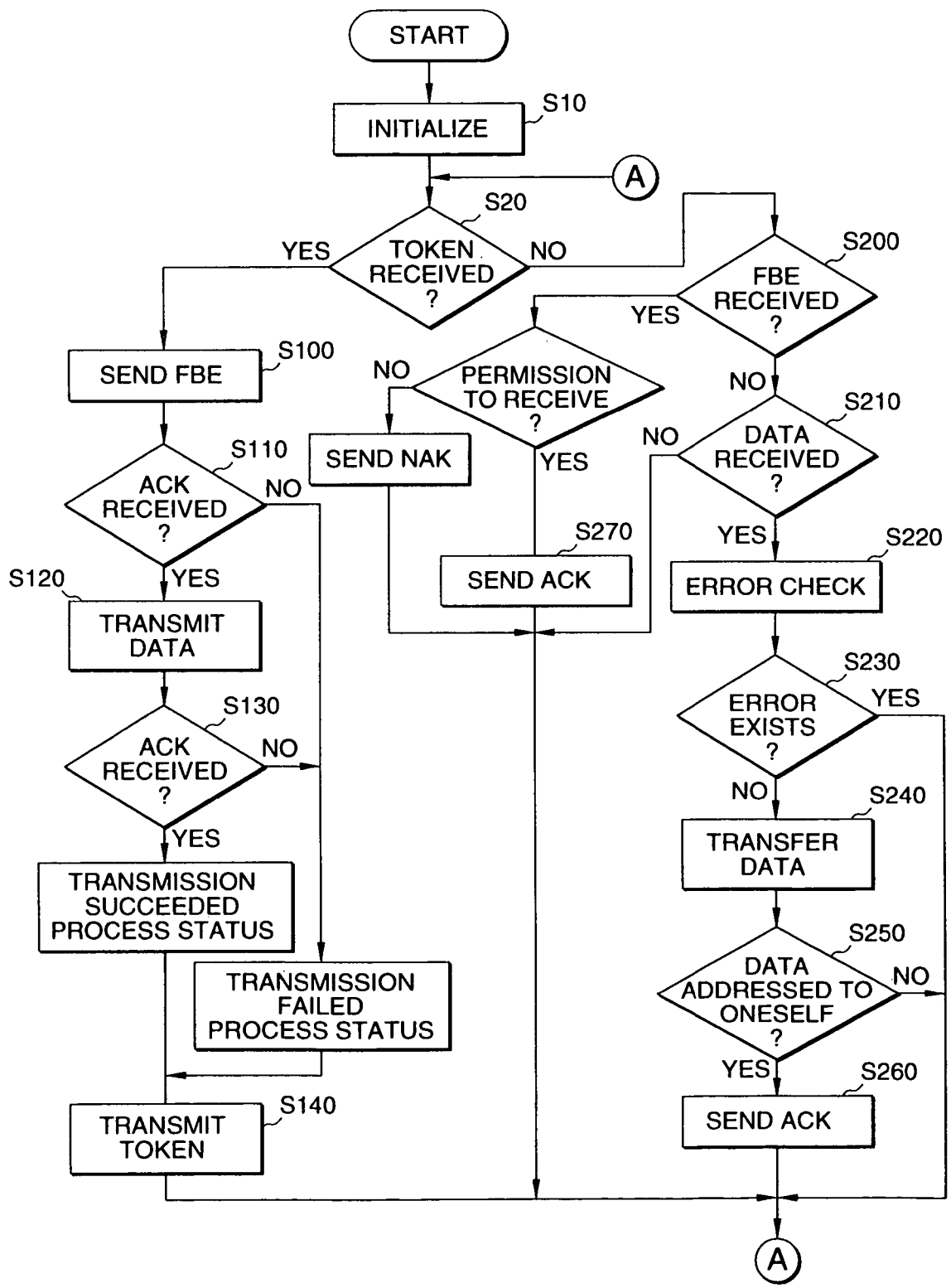
FIG. 26 is a flowchart showing a communication processing procedure according to the embodiment of the invention.

FIGS. 5 through 12 show processes for transmitting data from each node 10 by means of token passing and the storage contents in the communication buffer 102 of each node 10. FIG. 26 shows a communication control procedure executed by the micro-sequencer 101 of each node. It is noted that the control procedure is described by a program language which can be executed by the micro-sequencer (CPU) 101 and is stored in a ROM (not shown) within the micro-sequencer 101.

Figure 5:
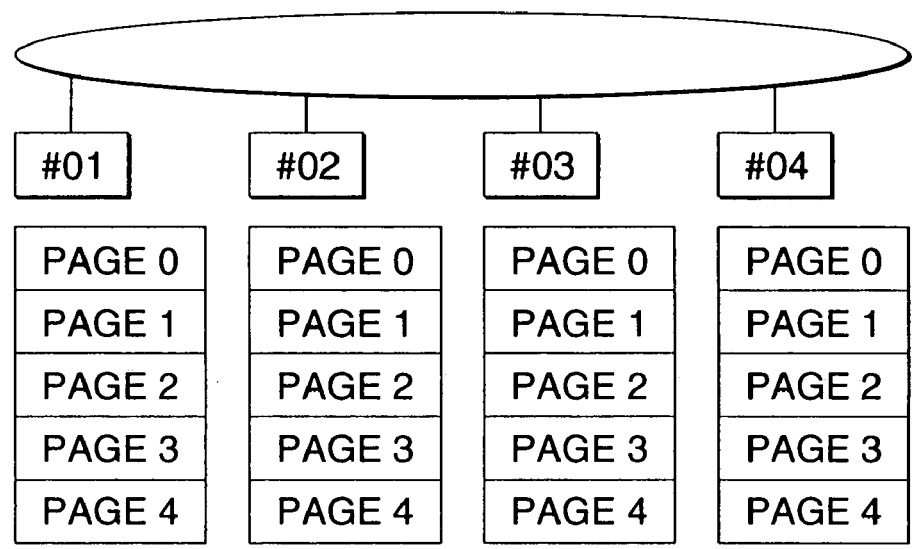
FIG. 5 is an explanatory chart showing the communication method of the invention.
Figure 6:
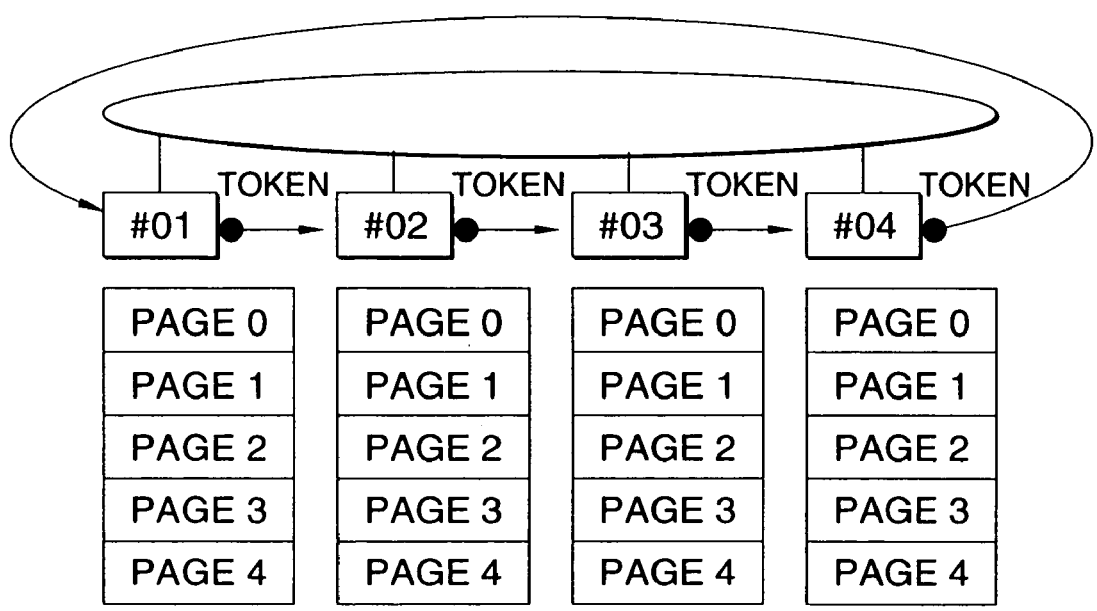
FIG. 6 is an explanatory chart showing the communication method of the invention.
Figure 7:
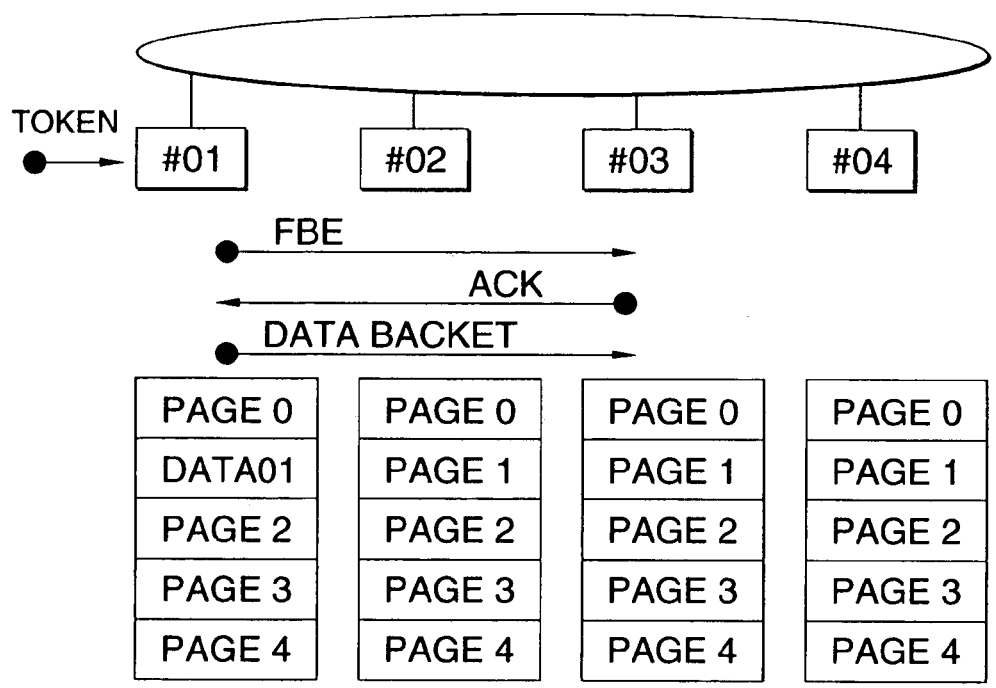
FIG. 7 is an explanatory chart showing the communication method of the invention.

The communication method in the 4-node system structure as shown in FIG. 5 will be explained. When power is put in each node and the initialization process is finished in such system structure (Step S10 in FIG. 26), the token is circulated as shown in FIG. 6 and the data transmission right is circulated. In Node #01, the internal device writes data 01 to be transmitted to Page 1 within the communication buffer 102 (own transmitting buffer) (see FIG. 7). Then, the micro-sequencer 101 creates transmission data having the format in FIG. 4 by using this written data and waits to receive the token (the loop process of Steps S20→S200→S210→S20 in FIG. 26).

Then, receiving the token, the node whose ID is #01 (the micro-sequencer 101) transmits a query FBE to Node #3 to which the data is to be sent (Steps S20→S100 in FIG. 26). When Node #03 (the micro-sequencer 101) is ready to receive, it gives a receiving authorizing ACK indicative of that (see FIG. 7. Steps S200<S270 in FIG. 26). Receiving the ACK, Node #01 transmits DATA 01 stored in Page 1 of own communication buffer 102 to Node #3 in accordance to the data format in FIG. 4 (Steps S110→S120 in FIG. 26).

Figure 8:
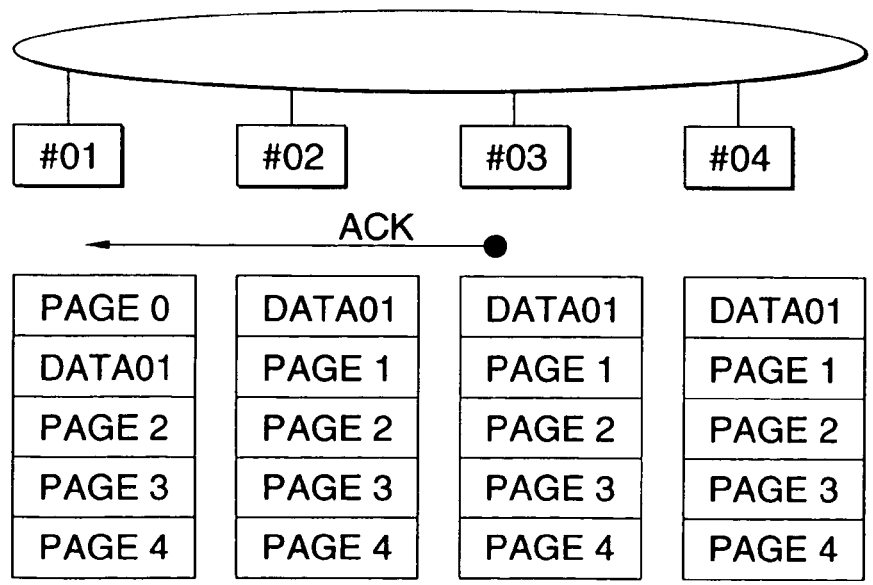
FIG. 8 is an explanatory chart showing the communication method of the invention.
Figure 9:
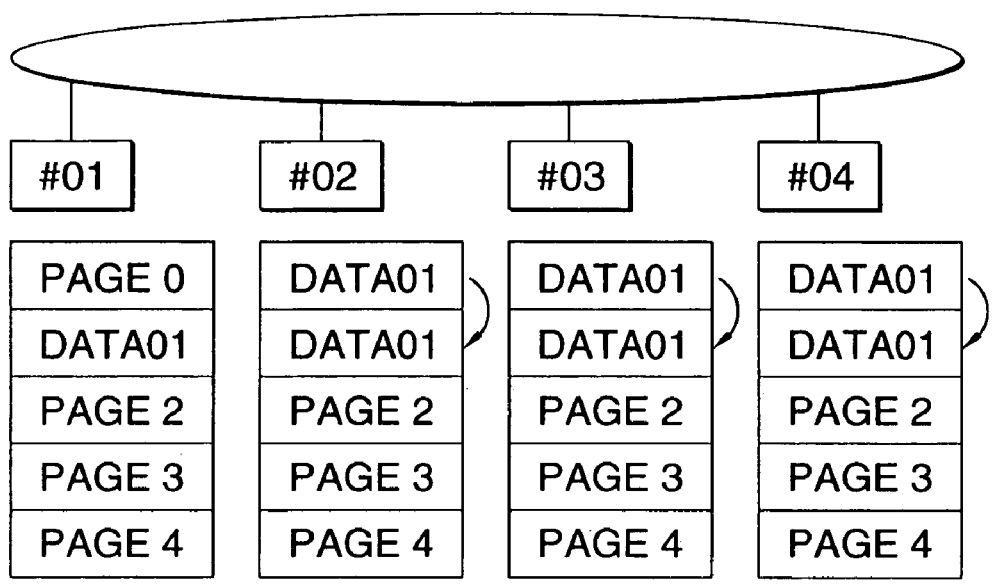
FIG. 9 is an explanatory chart showing the communication method of the invention.
Figure 10:
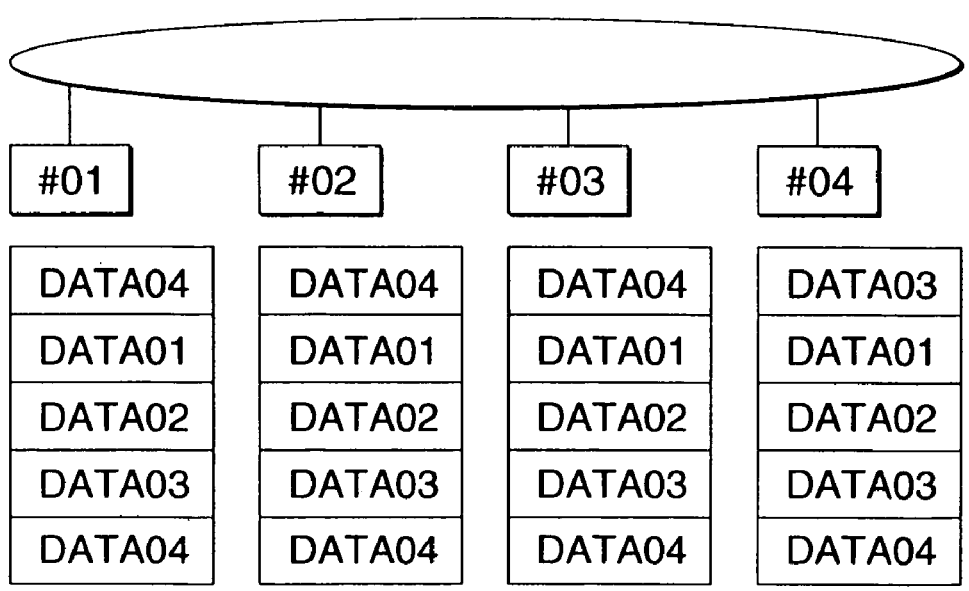
FIG. 10 is an explanatory chart showing the communication method of the invention.
Figure 11:
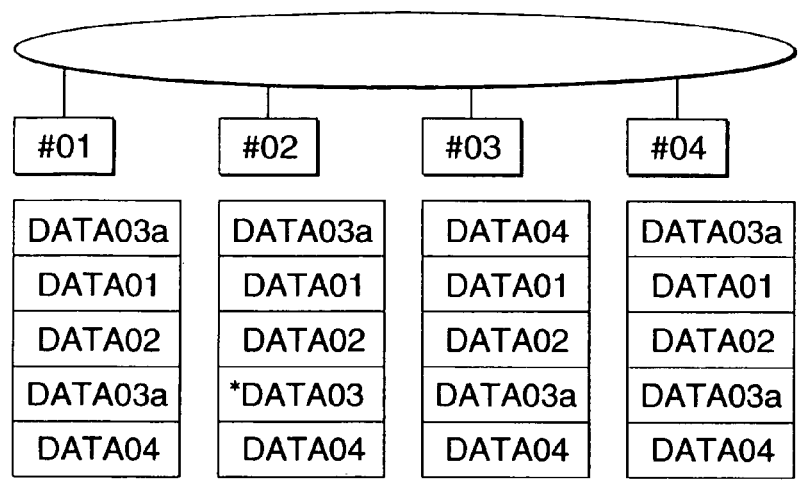
FIG. 11 is an explanatory chart showing the communication method of the invention.
Figure 12:
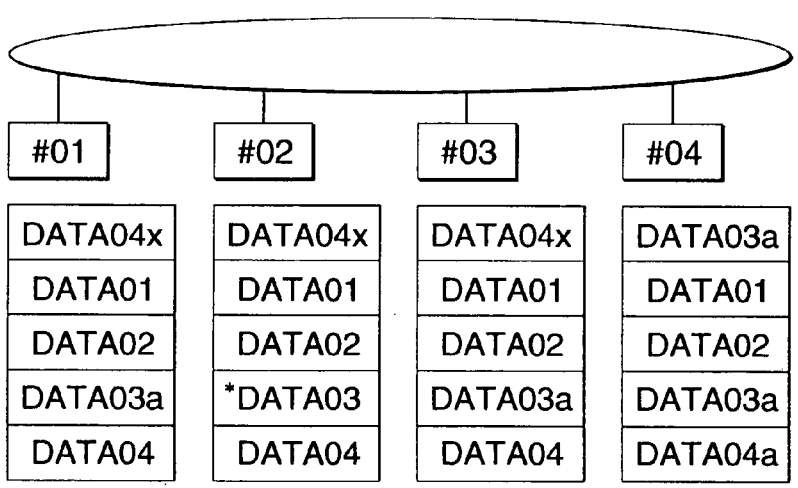
FIG. 12 is an explanatory chart showing the communication method of the invention.

Receiving this transmission data, Nodes #02 through #4 store it within the temporary buffer within the communication buffer 101 (Page 0, see FIG. 8). The micro-sequencer 101 checks errors in the data stored in the temporary buffer (Steps S20→S200→S210→S220 in FIG. 26). Then, after verifying that there is no error in the data, the micro-sequencer 101 of each node transfers and stores the received data DATA 01 stored in the temporary buffer to the storage area corresponding to the transmission originator, i.e., in Page 1 in this case (see FIG. 9. Steps S230→S240 in FIG. 26). After that, the token is passed to the next node #02 after waiting data receiving ACK from Node #03 of the transmission destination (Steps S130→S140→S20 in FIG. 26 as for Node #01, Steps S250→S260→S20 as for Node #03, and Steps S250→S20 as for the other nodes). Node #02 also carries out processes similar to those in Node #01 described above and transmits DATA 02 to the other node. When the similar transmission process is carried out thereafter to Node #04, the data of same contents is stored in the communication buffer of respective Nodes #01 through #04 as shown in FIG. 10. Therefore, all of the nodes can share the data.

Because the token is circulated among Nodes #01 through #04, all of the nodes can share the data in synchronism with the circulation. For instance, when Node #03 transmits new data, the previous transmission data is overwritten and stored in the present embodiment (see FIG. 11).

However, it is also possible to accumulatively store a predetermined number of times of transmission data by dividing each storage area further into a plurality of storage areas.

When data DATA 04*a* transmitted from Node #04 to Node #01 is transformed into DATA 4*x* due to a fault on the transmission path, each Node (#01 through #03) detects that an error has occurred by checking the data. Accordingly, the data in the temporary buffer is not transferred to the corresponding storage area (see FIG. 12, Steps S230→S20 in FIG. 26). Node #01 also does not transmit ACK data indicative of that the data has been received normally to Node #04. Thereby, Node #04 detects that the communication error has occurred. Detecting the transmission error, Node #04 may transmit DATA 4*a* again when the token comes in the next time or may transmits the latest data DATA 04*b* when DATA04*b* is generated as data to be transmitted anew.

Figure 13:
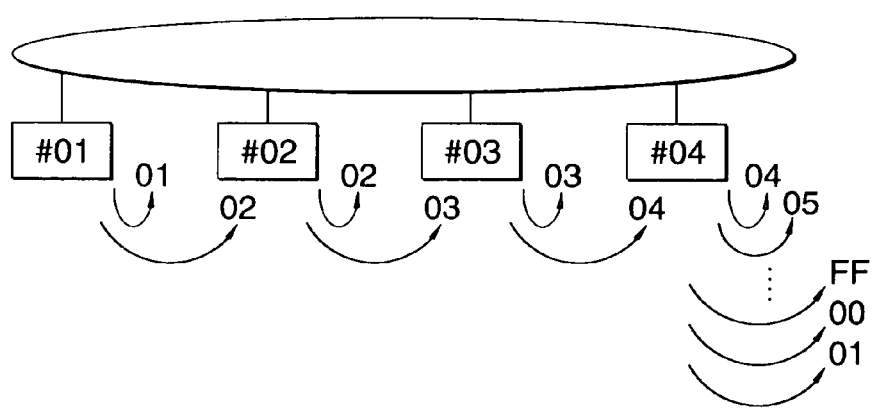
FIG. 13 is an explanatory chart showing a network constructing method according to an embodiment of the invention.

Next, initializing processes in turning power on or in recovering from a failure will be explained. Each node detects ID of the adjoining node while incrementing ID of the node to which the token is to be passed in the initializing process to discriminate the ID of the adjoining node to which the token is to be passed in the conventional token passing communication method, for example, called as ARCNET (the token does not circulate when ID of non-connected node is set as a destination to which the token is passed. Thereby, it can be found that the node of ID thus set is a non-connected node. See FIG. 13). Accordingly, it takes time for each node to detect ID of the adjoining node. In particular, it is problematic to take time for the initializing process when all nodes are fixedly set like a vehicle and a number of nodes changes depending on the type of the vehicle. In view of the case when the number of nodes is fixed, a positive number is assigned as ID to be assigned to each node ID in a predetermined sequence, i.e., in order from #01 in this case, in the present embodiment. Then, it allows the node having the last ID to find that it is the last ID from the coincidence of the MAX ID signal with own ID.

Figure 14:
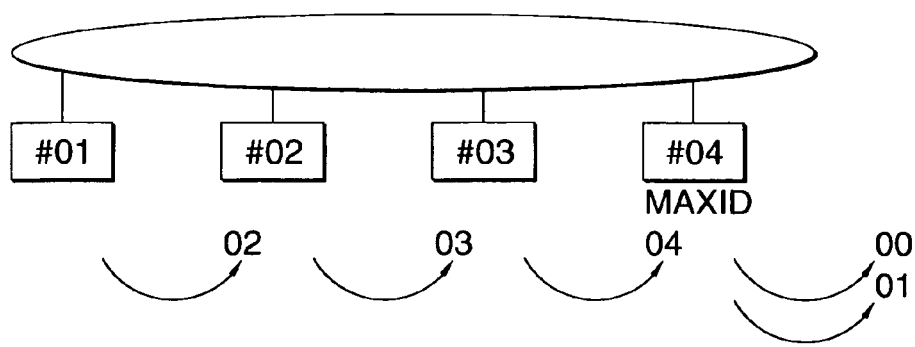
FIG. 14 is an explanatory chart showing a network constructing method according to the embodiment of the invention.
Figure 15:
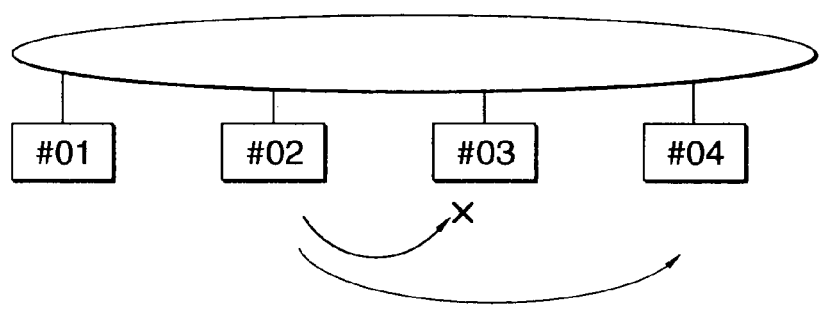
FIG. 15 is an explanatory chart for explaining a token passing method according to the embodiment of the invention.

The node whose own ID coincides with the MAX ID initializes a node ID to which the token is to be passed at #01. A node whose own ID does not coincide with MAX ID initializes a node to which the token is to be passed at ID which is incremented by +1 from own ID (see FIG. 14).

Figure 27:
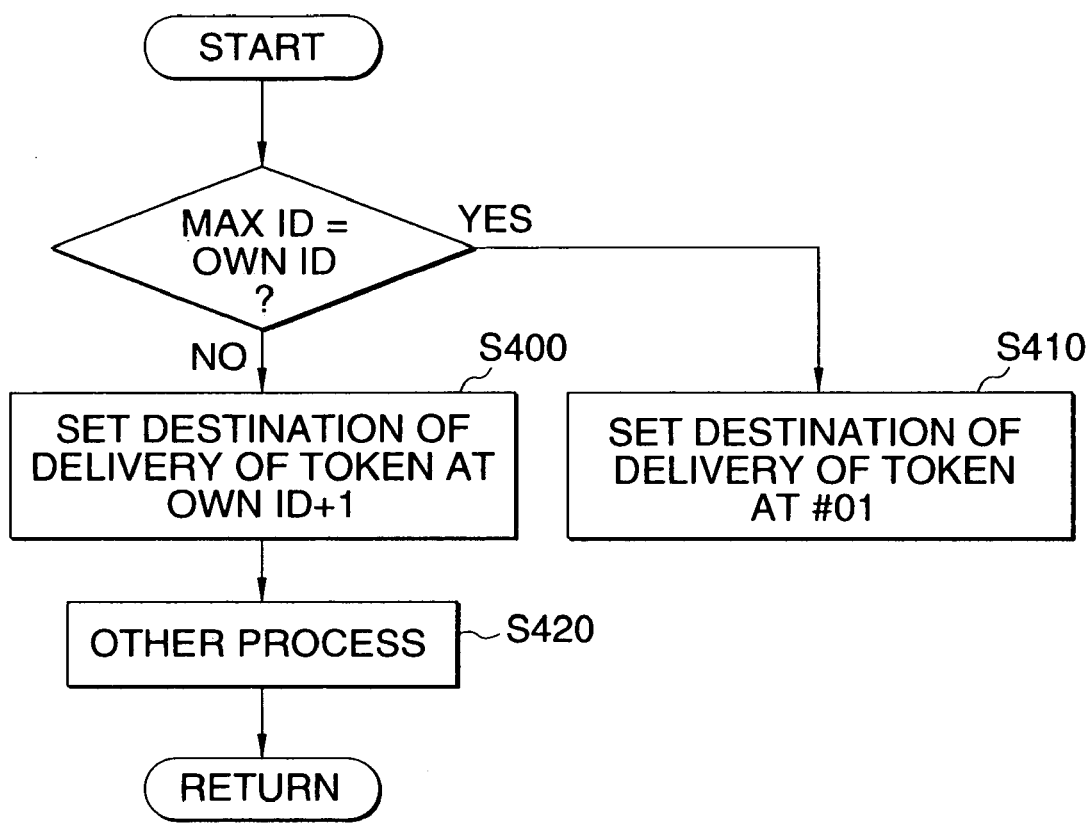
FIG. 27 is a flowchart showing a communication processing procedure according to the embodiment of the invention.

It becomes unnecessary for each node to detect the ID of adjoining node by implementing such initializing process and the time for the initialization may be shortened considerably as compared to the past one. Further, it allows the communication program to be generally used without being influenced by the type of vehicle (by the increase/decrease of number of nodes) because it will do just by inputting the MAX ID signal corresponding to extension of the system and to the type of vehicle. FIG. 27 shows the sequence of the initializing process carried out by the micro-sequencer 101 for reference. Step S400 is a process executed by the micro-sequencer of a node whose own ID does not coincide with MAX ID. Step S410 is a process executed by the micro-sequencer of a node to which MAX ID has been inputted.

Step S420 is an initializing process similar to the past one executed in common.

Figure 16:
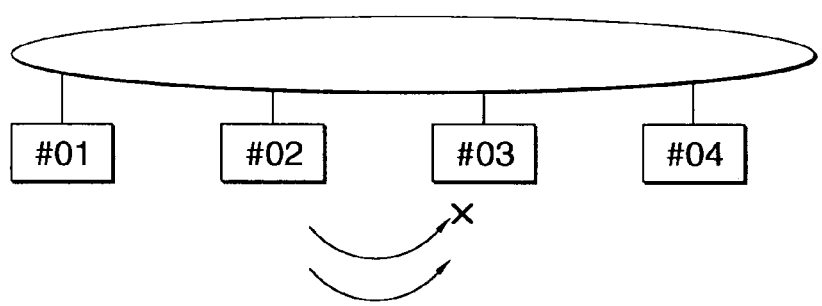
FIG. 16 is an explanatory chart for explaining a token passing method according to the embodiment of the invention.
Figure 28:
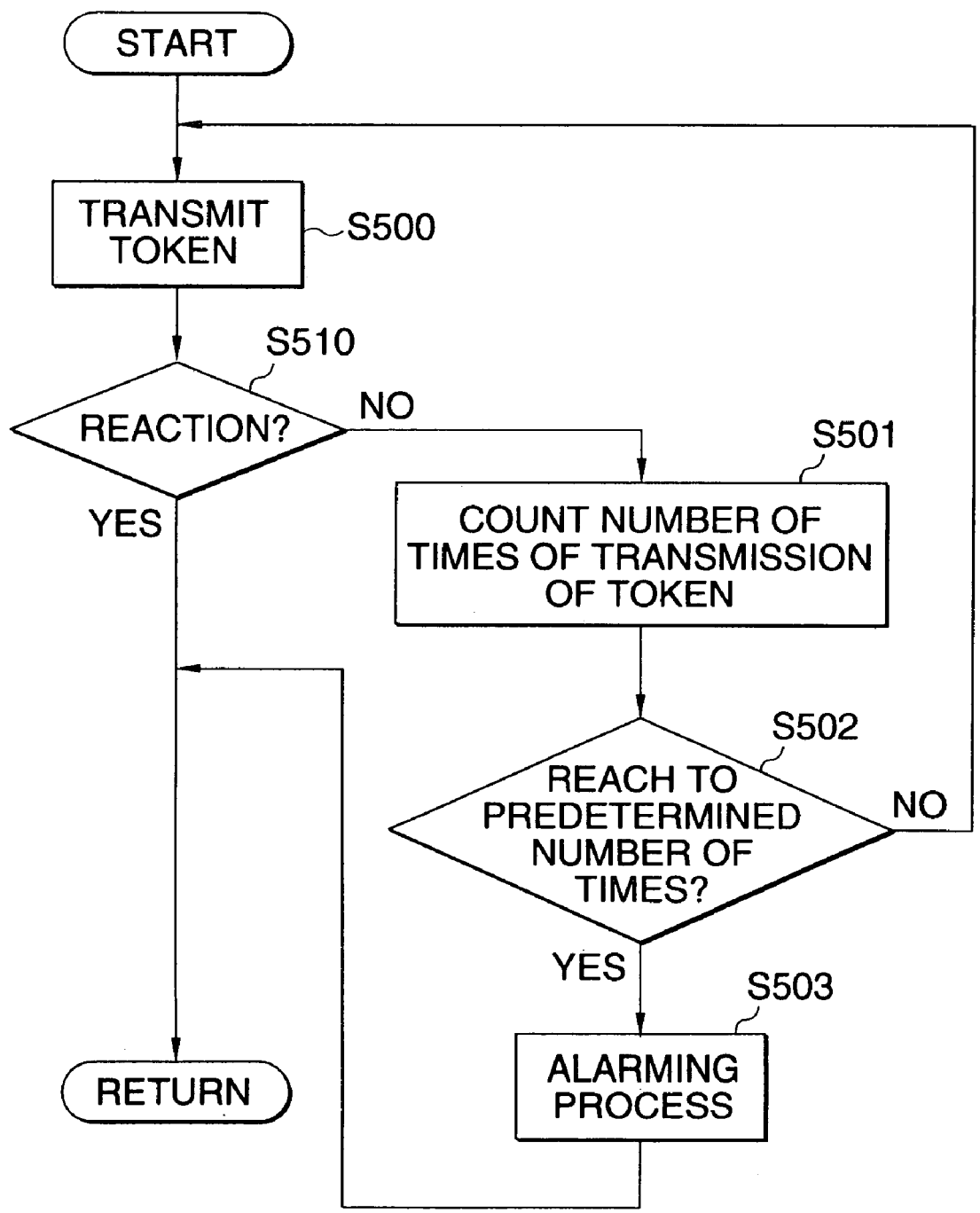
FIG. 28 is a flowchart showing a communication processing procedure according to the embodiment of the invention.

The token is passed to the adjoining node in the prior art token passing communication method like ARCNET. However, when there is no reaction from the adjoining node during the passing, own node increments (by +1) ID of a node to which the token is to be passed to find the node to which the token is to be passed. Therefore, there has been a problem that the adjoining node does not react at all when the token is not transmitted normally due to noises and others even when the adjoining node is actually connected to LAN and the token is passed to the next node in disregard of the original node to which the token is to be passed. Then, the token passing is carried out by a plurality of times when no reaction is obtained as shown in FIG. 16 in the present embodiment. To that end, a maximum number of times of token passing N is set in advance and the micro-sequencer 101 executes the processing procedure in FIG. 28. When the micro-sequencer 101 can obtain no reaction (NO in Steps S500→S510 in FIG. 28) in transmitting the token (Step S140 in FIG. 26), it repeats the token passing process up to the maximum N times (a loop process from Step S501→S502→S500→S510). When there is a reaction during this time (YES in Step S510), the token passing process ends.

Meanwhile, when the micro-sequencer 101 can obtain no reaction after carrying out the token passing process by a predetermined number of times, e.g., N=2 times, it executes an alarming process. The process for detecting the adjoining node is carried out after the alarming process as a matter of course.

Figure 17:
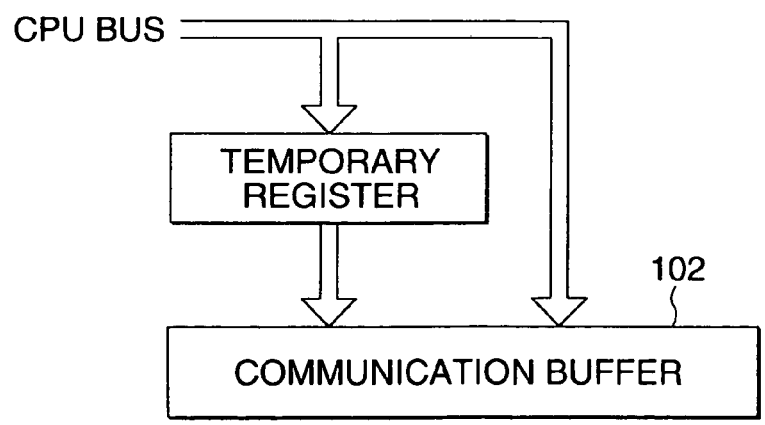
FIG. 17 is a block diagram showing the circuit structure of the other embodiment 1 of the invention.
Figure 18:
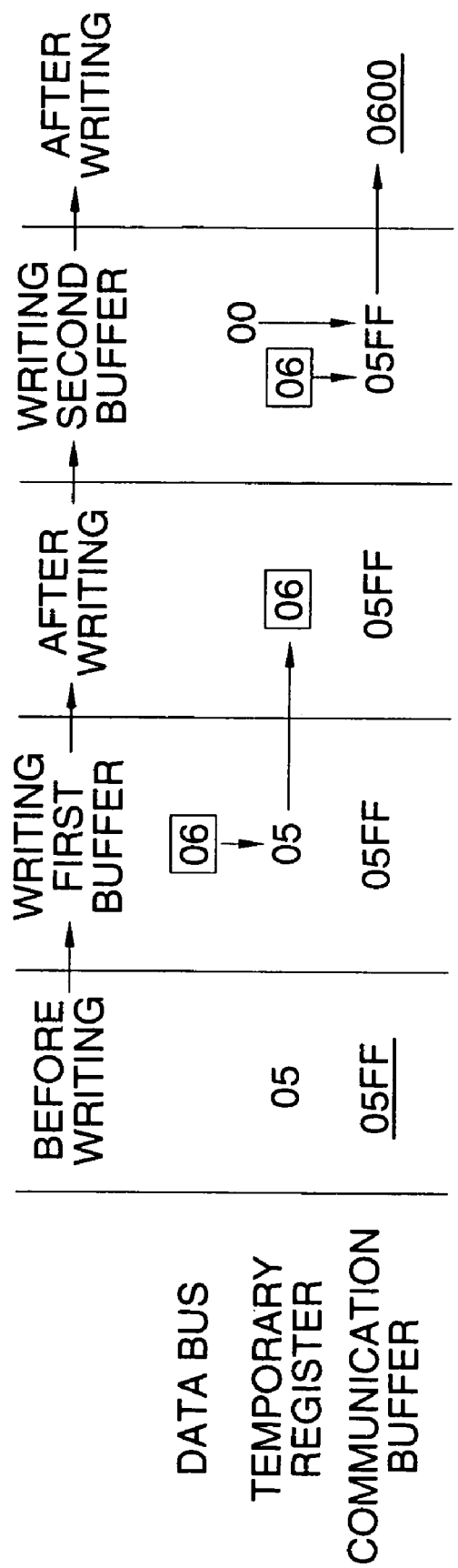
FIG. 18 is an explanatory chart for explaining the operation of the other embodiment 1 the invention.
Figure 19:
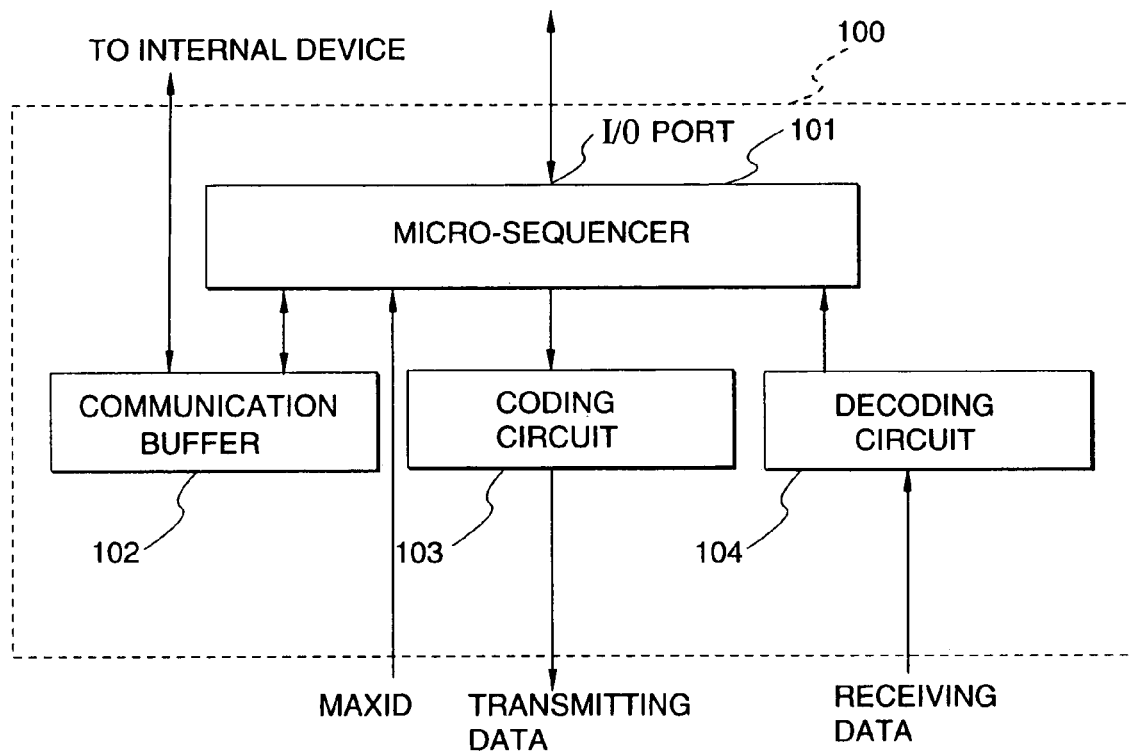
FIG. 19 is a block diagram showing the circuit structure of the other embodiment 2 of the invention.

The communication device (LSI communication controller) 100 in FIG. 3 is connected to a device to be controlled, e.g., a controller (CPU) and the like for controlling a brake, via a CPU bus and transfers data received from the controller to the other nodes via LAN. It also passes data received from the other node to the controller. When the data transferred on the side of LAN is 16 bits, a 16-bit CPU must be used on the side of controller. However, there is a case when an 8-bit CPU is used on the side of controller. In this case, there is a danger that data is automatically transmitted while rewriting data of the CPU. In view of such case, a temporary register is provided between the controller (internal device in FIG. 3) and the communication buffer 102 as shown in FIG. 17. A timing signal generating circuit not shown generates a latch command signal so as to hold (latch) 8-bit data of the first time sent from the controller in the temporary register, to create 16-bit data by data directly sent from the controller and the data latched in the temporary register and to generate a write signal to write it into the communication buffer 102 (see FIG. 18).

When the controller uses the 16-bit CPU, the temporary register may be also disabled (the timing signal generating circuit generates no latch command signal). In this case, a binary signal indicative of using/not using the temporary register is given to the timing signal generating circuit from the outside so that it generates an adequate latch command signal and write signal in correspondence to this command.

The internal device such as the controller writes the transmission data to the communication buffer 102 and the micro-sequencer 101 reads the transmission data to transmit to the other node as shown in FIG. 3 in the embodiment described above. Then, as another embodiment, it is possible to arrange so as to exchange data with the internal device via an I/O port of the micro-sequencer 101 without going through the communication buffer 102. In this case, a command whether to use or not use the communication buffer 102 is given to the micro-sequencer 101 from the outside to initialize by the micro-sequencer 101 whether data is to be taken in via the I/O port or via the communication buffer 102.

Figure 20:
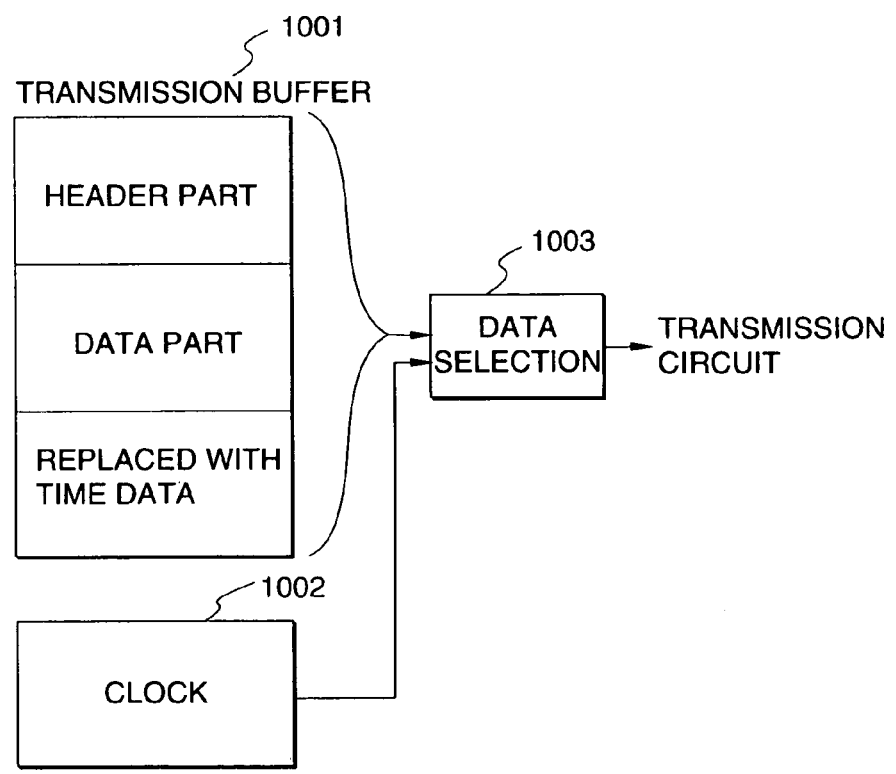
FIG. 20 is a block diagram showing the circuit structure of the other embodiment 3-1 of the invention.

While the data in the format shown in FIG. 4 is transferred to the other nodes in the embodiment described above, the two nodes of the data transmission originator and the transmission destination may be synchronized by controlling an internal clock of the device based on clock data by adding clock data as shown in FIG. 21. It is also possible to switch (select) a first mode in which the clock data is added with a second mode in which no clock data is added. FIG. 20 shows a circuit structure for that end. A transmission buffer 101 for creating transmission data is provided within a memory of the micro-sequencer 101. The reference numeral (1002) denotes a clock. When the first mode is specified from the outside, the micro-sequencer 101 writes normal transfer data in an area corresponding to the clock data of the transmission buffer. When the second mode is specified, the micro-sequencer 101 creates transmission data by combining the remaining data with the clock information obtained from the clock 1002 without using the data in the storage area corresponding to the clock data. The micro-sequencer 101 functions as a data selecting circuit 1003 in this case. Thereby, the clock data at the moment of transmission may be sent on the network.

Next, an embodiment of controlling the time in all of the nodes by using the clock information explained in the other embodiment 3-1 will be explained.

Figure 22:
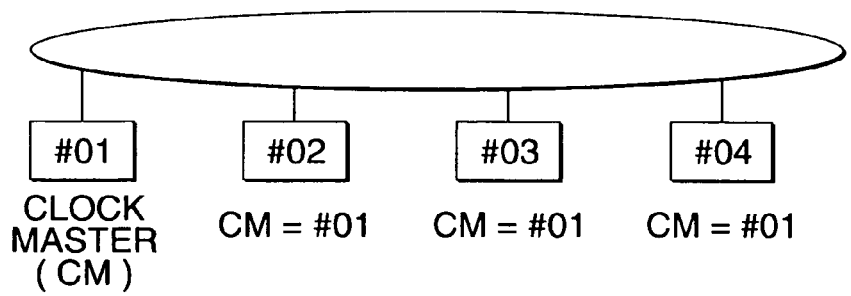
FIG. 22 is an explanatory chart showing a communication format of the other embodiment 3-2 of the invention.

A clock master informing of reference time is set in advance among the nodes connected to LAN as shown in FIG. 22 so that the node of the clock master informs of the clock information to the other nodes.

Figure 23:
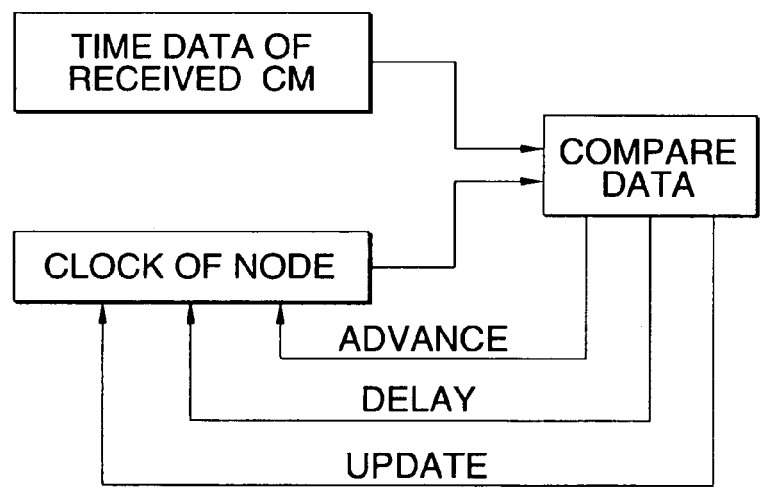
FIG. 23 is an explanatory chart for explaining the operation of the other embodiment 3-2 of the invention.

Receiving the clock information from the clock master, the node controls the internal clock so as to be synchronized with the received reference clock data by the micro-sequencer 101 as shown in FIG. 23. Because the internal clock is normally realized by means of counting process of hard process, a value of the counter is updated. It is noted that time may be synchronized by carrying out the following process when it is a problematic to return the clock to the past like a control of a vehicle.

The reference clock data received from the clock master is compared with clock data indicated by the internal clock as shown in FIG. 23. When the difference between the reference clock and the time to be controlled falls within a certain allowance as a result of comparison, the rate of the internal clock is advanced or retarded slightly or is kept as it is based on the difference. Thereby, the internal clock may be synchronized with the reference clock during the normal operation.

Meanwhile, when the difference does not fall within the allowance, it is judged that the initialization is not set yet and the internal clock is updated to the reference clock. This process is carried out automatically by a dedicated digital circuit.

The clocks of all nodes indicate almost the same time with the time of the clock master by giving such time controlling function to each node.

Figure 24:
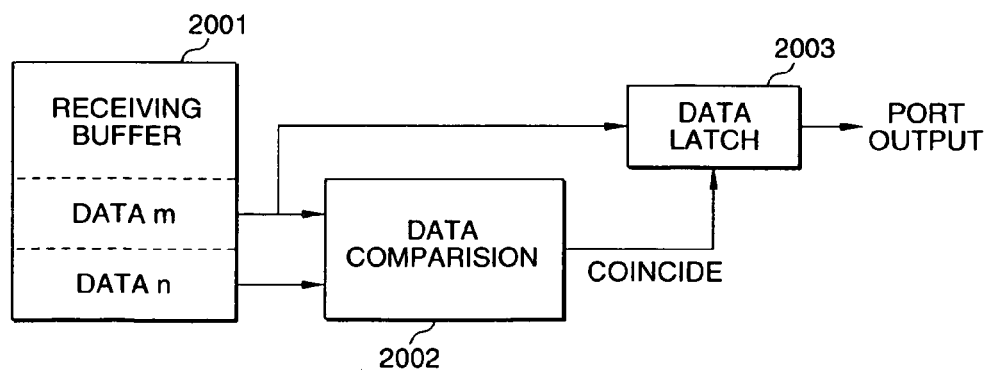
FIG. 24 is a block diagram showing the circuit and system structure of the other embodiment 4 of the invention.

While the received data is read by the CPU in the embodiments described above, FIG. 24 shows a communication device which receives data without CPU. In FIG. 24, the reference numeral (2001) denotes a receiving buffer for receiving data on LAN. The node 10 to which the token has been passed transmits the same data twice in the embodiment.

The reference numeral (2002) denotes a comparator for comparing whether or not two transmission data m and n received by the receiving buffer 2001 coincide. The reference numeral (2003) denotes a latch circuit such as a flip-flop for latching either one of the data m or n and for outputting the latched data via a port as receiving data when they coincide by the comparator 2002.

Such circuit structure allows data to be received and an error check to be carried out by the simple arrangement without the data verification carried out by the CPU by multiplexing data, in addition to an error check code.

The receiving buffer may receive only data addressed to it or receive all transferred data on LAN.

The CMI coding method described in the above-mentioned embodiments will be explained briefly.

Figure 25:
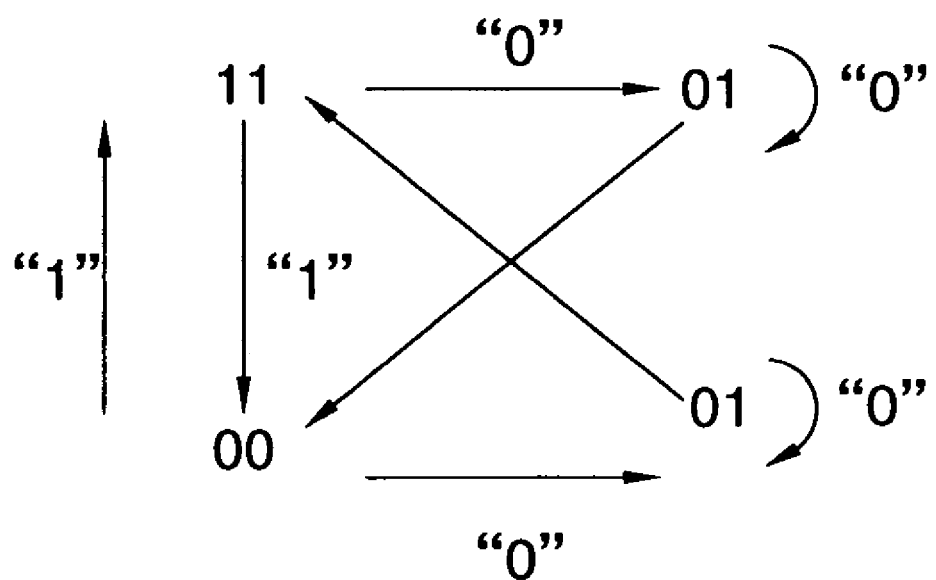
FIG. 25 is an explanatory chart for explaining CMI coding.

Although packet data transferred among the respective nodes has the CRC error check code in ARCNET known as a communication protocol for a vehicular control system, that data cannot be used if the data is destroyed even by 1 bit due to spike noise and the like. Then, the transfer data is coded in CMI in the embodiment described above in addition to adding the error check code to the transfer data. The CMI coding may be defined in four states and 1 bit is represented by two symbols as shown in FIG. 25.

The possible state of a value is defined from the state of a previous signal in the CMI coding method, so that when a symbol not corresponding to that is received, it is judged that an error has occurred during transmission and the error may be corrected automatically.

For instance, when the receiving symbol is 11010100, the data indicates "1001". When a communication error occurs and the receiving symbol becomes 1101[11]00 (data surrounded by parentheses is the place where the error has occurred), the part in the parentheses 11 is impossible symbol. A possible symbol after 1101 is 01 or 00 and the symbol 01 having Hamming distance closest to 11 is set as a corrected value. No CRC error occurs even when the micro-sequencer 101 makes CRC check because such automatic data correcting process is carried out by the decoding circuit 104 (see FIG. 3) before inputting the receiving data to the micro-sequencer 101.

The following embodiment may be carried out besides those described above.

1) Although the CRC code has been used as the error check code contained in the transmission data in the embodiment described above, a parity code or other known error check code may be used when high communication accuracy is not required.

2) Although it has been informed that an error has occurred and data has to be transmitted again by not sending ACK to the data of the transmission originator when the node of the data destination detects error data in the embodiment described above, a special command may be prepared and to transfer this command from the node of the transmission destination to the node of the transmission originator.

3) The above-mentioned embodiments are suitable for a communication system used in a vehicular control system. In this case, the node is an electronic control unit (ECU) controlling each mechanism of the vehicle. A communication protocol in which nodes have no priority, i.e., a communication protocol in which no priority is given for arbitration when a plurality of nodes access to one node, e.g., a communication protocol used in the above-mentioned ARCNET, may be used for the communication between the nodes. Although the present invention is suitable for the vehicular control system, it is needless to say that the invention may be applied to other control systems. It is noted that the modification of the above-mentioned embodiments falls within the technological scope of the invention as far as it is based on the technological concept described in claims.

As described above, according to the first aspect, the 18 th aspect and the 21 st aspect, each node stores data addressed to other node in connection with the node of the transmission originator, so that all of the nodes can share the whole data transmitted when the token circulates all of the nodes once. The sharing of data allows the plurality of nodes to execute control processes in cooperation and synchronism. Thereby, the reliability of the whole system may be enhanced.

According to the second aspect of the invention, the correspondence between the storage area and ID of the node may be simplified, the storage address in the storage area may be simply led from ID of the node and the storage may be controlled (control for reading/writing data) readily by assigning data to the storage area corresponding to own node.

According to the third aspect of the invention, data may be transmitted directly without going through the storage unit which realizes the function as a communication buffer and a multiplex communication device may be connected to a device generating transmission data whose communication specification is different, e.g., to a device which is unable to write data to the storage unit.

According to the fourth aspect of the invention, each node is not required to have a process for automatically retrieving an adjoining node by specifying the last node.

According to the fifth to the seventh aspect of the invention, error-free data is stored in the storage area of the storage unit by temporarily storing the received data in the temporary buffer. Therefore, it is possible to block an erroneous control from being made and to keep the safety of the whole system even if a device making a control by using the receiving data reads the receiving data of the storage unit to make a control.

According to the eighth aspect of the invention, the state of communication will not confuse even if a number of nodes receive data because the node at the transmission destination confirms the receiving.

According to the ninth aspect of the invention, data errors which can be recovered increase and a number of times of re-transmission of data due to data error decreases, thus shortening the communication time, by CMI-coding the data containing the data check code.

According to the 10 th aspect of the invention, the reliability on the token communication is enhanced by giving the token re-transmission function to the nodes.

According to the 11 th to the 13 th aspect of the invention, the clocks of the transmission originator and the transmission destination may be controlled so that they indicate the same time based on clock information by adding the clock information to the transfer data. The invention may be used as a LAN communication system of a multi-use system because it allows modes of adding/not adding the clock information to be selected.

According to the 14 th aspect of the invention, the double data error check functions may be added to the node by additionally using the CRC code and the like and a communication system having a high data reliability may be constructed.

According to the 15 th aspect of the invention, it is possible to connect with both external units using an 8-bit CPU and a 16-bit CPU by allowing data having a different bit number to be inputted.

The invention brings about the maximum effect in use in a vehicle by applying the feature in the 16 th, the 17 th, the 19 th, the 20 th, the 22 nd, and the 23 rd aspect of the invention to the vehicular control system. In addition, it becomes possible to detect errors in communication data by 100% by containing the CMI coding to the communication data. Further, transmission of information of a specific node will not be delayed extremely by using the communication protocol having no priority in the node-to-node communication.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A multiplex communication method comprising:

determining a transmitting node obtaining a data transmission right based on a token circulated among a plurality of nodes;

transmitting data by specifying another specific node as a transmission destination from the node obtaining said data transmission right;

obtaining clock information by the node having said data transmission right; and adding the obtained clock information to the data to be transmitted;

determining a clock master for providing a reference clock information in advance among said plurality of nodes;

transmitting data including the reference clock information by said clock master;

receiving the reference clock information within the data transmitted from said clock master by nodes other than said clock master;

comparing an internal clock information of an internal clock of the node that receives the reference clock information with the reference clock information;

slightly advancing, slightly retarding or keeping the internal clock as is, when a difference between the internal clock information and the reference clock information falls within a certain allowance; and updating the internal clock information to the reference clock information, when the difference between the internal clock information and the reference clock information does not fall within the allowance.

2. The method according to claim 1, further comprising selecting each of a first mode of transmitting by adding clock information or a second mode of not adding clock information.

3. The method according to claim 1, further comprising:

adjusting an internal clock according to the reference clock information indicated by the received clock information.

4. A multiplex communication method comprising:

circulating a first token among a plurality of nodes;

determining a first transmitting node obtaining a data transmission right based on said first token circulated among said plurality of nodes;

transmitting data from said first transmitting node by specifying a second transmitting node as a transmission destination from said first transmitting node obtaining said data transmission right;

obtaining clock information by the node having data transmission right;

adding the obtained clock information to the data to be transmitted;

determining a clock master for providing a reference clock information in advance among said plurality of nodes;

transmitting data including the reference clock information by said clock master;

receiving the reference clock information within the data transmitted from said clock master by nodes other than said clock master;

comparing an internal clock information of an internal clock of a node that receives the reference clock information with the reference clock information;

advancing, retarding or maintaining the internal clock as is, when a difference between the internal clock information and the reference clock information falls within a certain allowance; and updating the internal clock information to the reference clock information, when the difference between the internal clock information and the reference clock information does not fall within said certain allowance.

* * * * *